(12) United States Patent
Beltramino et al.

(10) Patent No.: US 12,125,024 B2
(45) Date of Patent: Oct. 22, 2024

(54) METHODS AND SYSTEMS ENABLING EXTERNAL ENTITY TO PROVISION PAYMENT CREDENTIALS TO A DIGITAL DEVICE

(71) Applicant: Mastercard International Incorporated, Purchase, NY (US)

(72) Inventors: Gabriel Beltramino, New York, NY (US); Piyush Maurya, South Amboy, NJ (US); Maurice David Liscia, Long Island City, NY (US); Charl Frederik Botes, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 358 days.

(21) Appl. No.: 16/911,004

(22) Filed: Jun. 24, 2020

(65) Prior Publication Data

US 2020/0410478 A1 Dec. 31, 2020

Related U.S. Application Data

(60) Provisional application No. 62/866,946, filed on Jun. 26, 2019.

(51) Int. Cl.
*G06Q 20/36* (2012.01)
*G06Q 20/32* (2012.01)
*G06Q 20/42* (2012.01)

(52) U.S. Cl.
CPC ..... *G06Q 20/3672* (2013.01); *G06Q 20/3227* (2013.01); *G06Q 20/363* (2013.01); *G06Q 20/425* (2013.01)

(58) Field of Classification Search
CPC .......... G06Q 20/3227; G06Q 20/3672; G06Q 20/363; G06Q 20/00–425
See application file for complete search history.

(56) References Cited

U.S. PATENT DOCUMENTS

2010/0078476 A1* 4/2010 Ben-Zvi .............. G06Q 20/349
235/380
2010/0311391 A1* 12/2010 Siu ........................ H04W 8/205
455/418

(Continued)

FOREIGN PATENT DOCUMENTS

JP 2018014088 A 1/2018
KR 20160046179 A 4/2016

OTHER PUBLICATIONS

PCT International Search Report and Written Opinion, Oct. 8, 2020, PCT Application No. PCT/US2020/039062, 10 pp.

*Primary Examiner* — Mohammad A. Nilforoush
(74) *Attorney, Agent, or Firm* — Buckley, Maschoff & Talwalkar LLC (57) ABSTRACT

Methods and systems for provisioning a secure element of a digital device with financial credentials of a consumer are disclosed. In an embodiment, an external entity computer receives from one of a merchant computer or a manufacturer computer, a consumer order for a digital device that includes a secure element (SE). The external entity computer then obtains, based on the digital device information setup data of a digital device which fulfills the order, and transmits a financial account provisioning request including the setup data and the consumer account information to a token service provider (TSP) computer. The process also includes the external entity computer receiving provisioning data including a personalization script which includes financial account token credentials of the consumer from the TSP computer, and then personalizes the ordered digital device with the financial account token credentials.

20 Claims, 6 Drawing Sheets (56) References Cited

U.S. PATENT DOCUMENTS

| | | | |
|---|---|---|---|
| 2013/0157637 A1* | 6/2013 | Bos | H04W 8/245 |
| | | | 455/418 |
| 2013/0282502 A1* | 10/2013 | Jooste | G06Q 20/40 |
| | | | 705/44 |
| 2014/0344153 A1* | 11/2014 | Raj | G06Q 20/027 |
| | | | 705/44 |
| 2015/0039494 A1 | 2/2015 | Sinton et al. | |
| 2015/0046339 A1 | 2/2015 | Wong | |
| 2016/0162883 A1* | 6/2016 | Liscia | G06Q 20/3278 |
| | | | 705/71 |
| 2016/0307184 A1* | 10/2016 | Peyton | G06Q 20/401 |
| 2017/0032370 A1* | 2/2017 | Beltramino | G06Q 20/36 |
| 2018/0270677 A1* | 9/2018 | Brisebois | H04L 47/283 |
| 2018/0324672 A1* | 11/2018 | Kang | H04W 12/06 |
| 2019/0108514 A1* | 4/2019 | Pendse | G06Q 20/3672 |

* cited by examiner

METHODS AND SYSTEMS ENABLING EXTERNAL ENTITY TO PROVISION PAYMENT CREDENTIALS TO A DIGITAL DEVICE

CROSS REFERENCE TO RELATED APPLICATIONS

This application claims the benefit of U.S. Provisional Patent Application No. 62/866,946 filed on Jun. 26, 2019, the contents of which are hereby incorporated by reference for all purposes.

FIELD OF THE INVENTION

Methods and systems for enabling an external entity, such as a certified warehouse, to provision payment credentials for digital devices. More specifically, in some embodiments the disclosed methods and systems permit a consumer to order or purchase a digital device online having an embedded secure element (SE) (for example, an Internet of things ("IoT") active and/or passive device, a wearable digital device such as a fitness tracker, a digital watch, a digital key fob, and the like) from a merchant or manufacturer, and then delegate provisioning of the consumer's payment card account to the ordered digital device. Once the provisioning is completed, the digital device is delivered to the consumer for activation of the digital payment card account.

BACKGROUND

Currently, a consumer with a digital device that includes an embedded Secure Element (SE) can follow a provisioning process to load a financial account (for example, a credit card account or debit card account) into a digital wallet stored in the SE of the digital device. In the case of a smartphone, implementations of the provisioning process can be straightforward for the consumer to utilize. However, in the case of provisioning a financial account to a digital wearable device (such as a fitness tracker) in many cases a consumer must first pair a smartphone, a laptop, or a personal computer via a Bluetooth interface to the digital wearable device and then provision the payment credentials. Some implementations of the provisioning process involve following multiple steps that are not intuitive and that can be time consuming, and thus such methods are not user-friendly. In other cases, the consumer may be required to travel to the merchant's physical retail store and place a purchased wearable digital device on a provisioning station, which obtains and then provisions the payment credentials via an NFC interface to the digital device, which can be inconvenient and can also be time-consuming.

It would therefore be desirable to provide a method and system that would allow a consumer to purchase and/or order a digital device online from a merchant's e-Commerce website or from a manufacturer's website and have the provisioning process taken care of by the merchant or manufacturer. Thus, when the consumer receives the ordered digital device he or she need only activate the financial account (which has already been provisioned to the SE of the digital device) by contacting the issuer of the consumer's financial account.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments, and which are not necessarily drawn to scale, wherein.

DETAILED DESCRIPTION

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of the embodiments may be practiced without some or all of the specific details. In other instances, well-known process operations have not been described in detail in order not to unnecessarily obscure novel aspects.

In general, and for the purposes of introducing concepts of embodiments of the present disclosure, disclosed herein are methods and systems for enabling an external entity, such as a certified warehouse of a merchant, to provision a consumer's payment credentials to electronic devices and/or digital devices (which include a secure element (SE) storage area or memory) that have been ordered and/or purchased by the consumer. Such digital devices may include, but are not limited to, Internet of things ("IoT") active and passive devices, and wearable digital devices. More particularly, in disclosed embodiments the external entity performs preliminary operations and/or performs a pre-setup process on the digital devices that are in inventory. The preliminary processing may involve a computer of the external entity running scripts needed to setup an embedded Secure Element (SE) on each digital device in inventory. The external entity computer then stores the setup data obtained from running the scripts on each such digital device in a local database for later use (i.e., for when an order comes in from a consumer for a particular digital device). Accordingly, when a consumer purchases and/or orders a new digital device from the merchant that has an embedded Secure Element (SE) (for example, a wearable device such as a digital fitness tracker), he or she may indicate during the checkout phase of the purchase from a merchant website, for example, that he or she wishes to have the digital device provisioned with his or her payment account credentials. In this situation, the external entity receives the purchase order from the merchant computer (hosting the merchant website) for the digital device along with the instructions to provision that device with the consumer's payment credentials. Next, in some implementations a computer of the external entity obtains a personalization script along with a Secure Element (SE) identifier from a trusted services provider (TSP) computer, locates that specific digital device in inventory and then physically obtains it from, for example, a warehouse storing merchant merchandise. The external entity computer next runs the personalization script to apply the personalization process to provision the obtained digital device with the customer's financial account token credentials, and then it is shipped to the customer. In some implementations, the external entity also notifies the TSP computer of the provisioning status.

For ease of understanding, the details of a purchase transaction between a merchant and a consumer have not been discussed in detail herein, but such processing typically includes a merchant acquirer financial institution (FI) of the merchant, a payment network, and the issuer FI that issued the consumer's payment account. It is sufficient to understand that such purchase transaction authorization processing typically requires authentication of the consumer and then authorization of the purchase transaction by the issuer FI before the purchased merchandize or service is provided to the consumer. Thus, in some embodiments, the disclosed personalization process by an external entity handling of the consumer's purchased digital device is not carried out until after the consumer has been authenticated and the purchase transaction has been authorized.

A number of terms will be used herein. The use of such terms is not intended to be limiting, but rather their use is for convenience and ease of exposition. For example, as used herein, the term "consumer" may be used interchangeably with the term "cardholder" and/or with the term "user," and these terms are used herein to refer to a person, individual, business or other entity that owns (or is authorized to use) a financial account such as a payment card account (such as a credit card account or debit card account). In addition, the terms "payment account," "payment card account" and/or "payment card system account" may include a credit card account, a debit card account, a loyalty card account, and/or a deposit account or other type of financial account that an account holder or cardholder may access or utilize for transactions. The term "payment card account number" includes a number that identifies a payment card system account, or a number carried by a payment card, and/or a number that is used to route a transaction in a payment system that handles debit card and/or credit card transactions and the like. The term "payment card" includes a credit card, debit card, prepaid card, or other type of payment instrument, whether an actual physical card, electronic, or virtual. As used herein, the term "payment card system" or "payment account system" or "payment card account system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations. In addition, the term "consumer device" or "user device" may be a wearable digital device (such as a digital watch, portable digital music player, a digital key fob, a fitness tracker device, and the like) and/or an electronic mobile device (such as a smart phone, tablet computer, personal digital assistant (PDA), laptop computer, or the like), and such devices may be wireless devices.

Figure 1A:
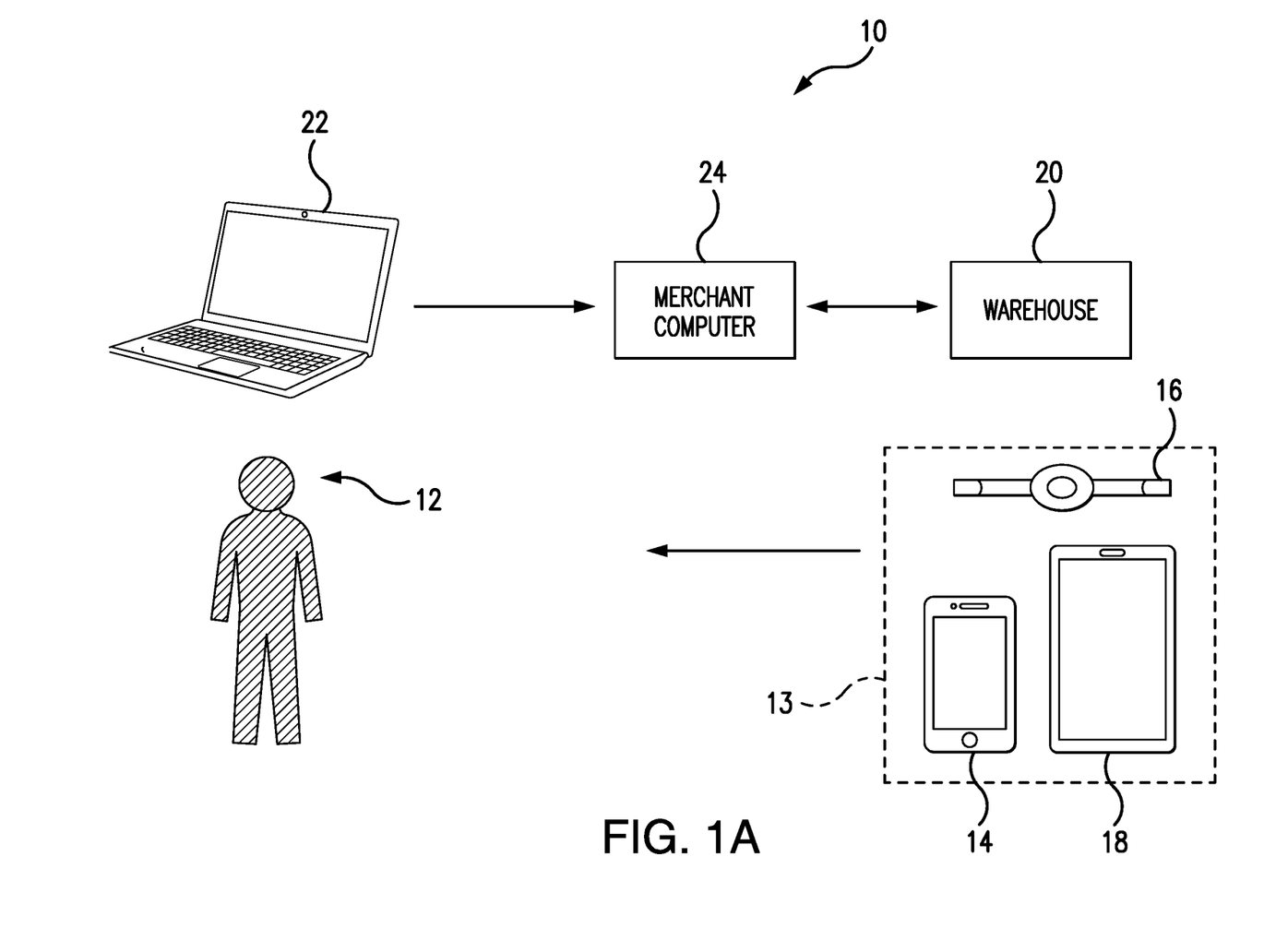
FIG. 1A is a block diagram of a purchasing and provisioning system that enables a consumer to purchase a digital device and to have it provisioned with the consumer's payment credentials by an external entity according to the present disclosure.

FIG. 1A is a block diagram of a purchasing and provisioning system 10 that enables a consumer 12 to purchase one or more digital devices 13 having secure elements (SE's) and to have one or more of them provisioned with the consumer's payment credentials by an external entity, such as a certified warehouse 20. For example, the consumer or cardholder 12 may utilize his or her laptop computer 22 to visit a merchant website hosted by the merchant computer 24 and select one or more digital devices 13, such as a smartphone 14, tablet computer, or wearable digital device 16. In a particular example, a consumer selects a wearable digital watch 16 for purchase and places it into a virtual shopping cart (not shown) and then decides to checkout and pay for the item. During a typical online checkout process, the consumer may be prompted to enter a shipping address, select a shipping option, and provide customer financial information (such as a credit card number, expiration date and CCV number) into a user interface checkout webpage to pay for the wearable digital watch 16 (Under some circumstances, such as for registered users the consumer information may already be stored by the merchant and thus automatically entered into the checkout webpage.) In accordance with processes disclosed herein, the consumer may also be presented with an option during the checkout process to have the wearable digital watch provisioned with payment account credentials of the consumer so that it can be capable of conducting purchase transactions in a merchant retail store. If the consumer requests the external entity to provision her wearable digital watch with payment account credentials, then it will be provisioned by the certified warehouse 20 in a manner which will be discussed below. After the purchase transaction is completed, the consumer will then receive a wearable digital watch 20 that has been provisioned with her financial account credentials. In embodiments disclosed herein, the consumer may be required to activate the provisioned financial account credentials before the wearable digital watch can be used to conduct purchase transactions.

For example, when the consumer receives her purchased wearable digital watch 16 and turns it on, she may be prompted to launch a digital wallet application which contains her financial account details. The digital wallet application may then communicate with the customer's issuer financial institution (FI) so that the consumer can activate her digital wallet account. After successful activation, which may involve the consumer providing a username and/or a password or other form of authentication data to the issuer FI, the consumer may then utilize the wearable digital watch 16 to conduct purchase transactions.

Figure 1B:
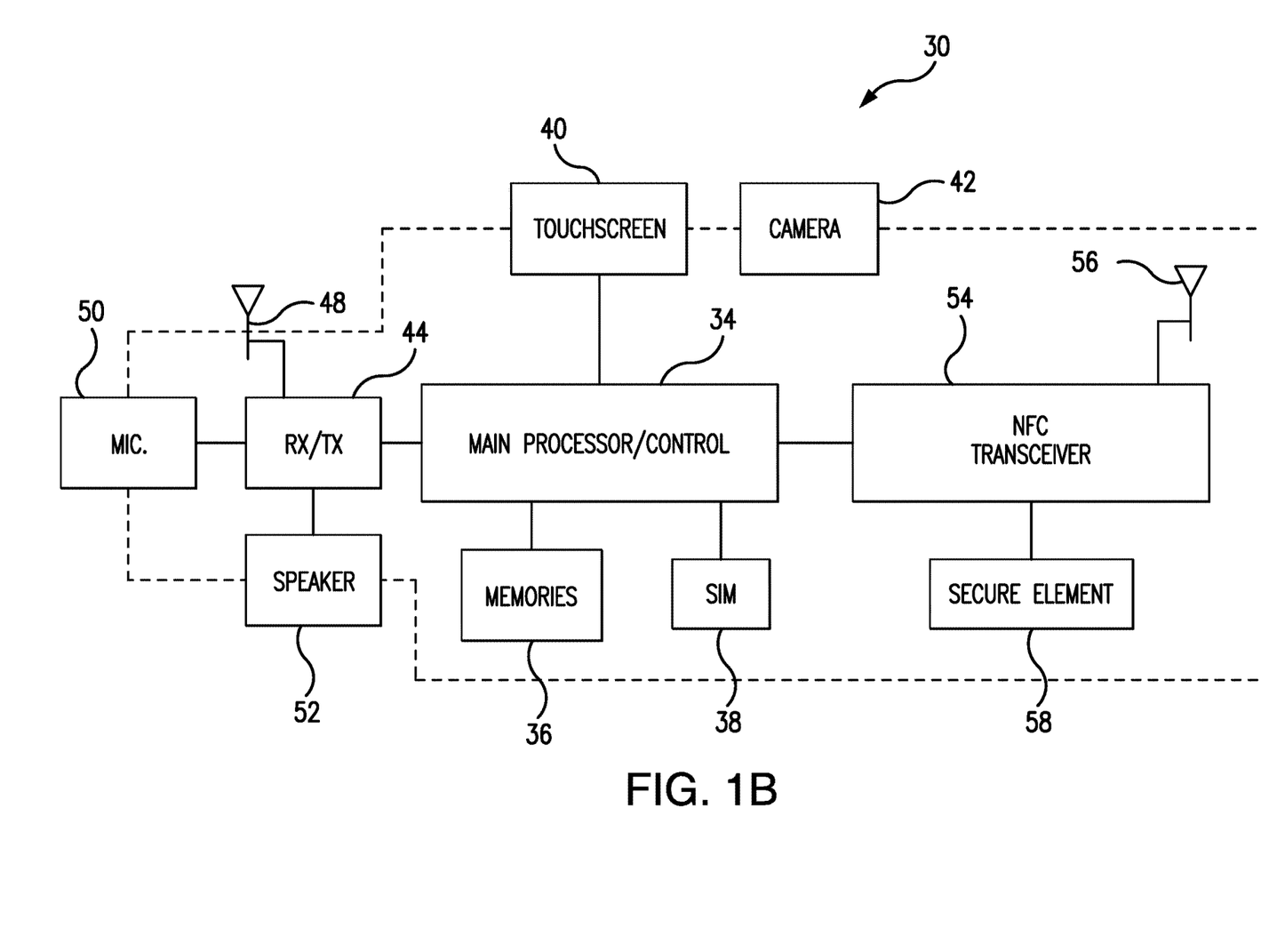
FIG. 1B is a block diagram illustrating an embodiment of a smartphone of a type that a consumer may purchase from a merchant in accordance with the disclosure.

FIG. 1B is a block diagram illustrating an embodiment of a smartphone 30 of a type that a consumer may purchase from a merchant. In this example, the smartphone 30 may be an "iPhone" marketed by Apple Inc., or one of the numerous smartphone models that run the "Android" operating system or the "Windows" operating system. As shown in FIG. 1B, the smartphone 30 may include a conventional housing (indicated by dashed line 32) that contains and/or supports the other electronic components, and it may be shaped and sized to be comfortably held by a customer's hand and thus may exhibit one of the many types of form factors common amongst current cell phones. The smartphone 30 includes control circuitry 34 for controlling the over-all operation of the smartphone, and may include one or more processors or microprocessors. Other components of the smartphone 30, which are in communication with and/or controlled by the control circuitry 34, include one or more memory devices 36 (e.g., program and working memory, etc.), a SIM (subscriber identification module) card 38, a touchscreen 40 which serves as the primary input/output device for the smartphone 30 and thus can receive input information from the user and may display output information to the user, and a camera 42. Some models of smartphones may also include one or more physically-actuatable switches and/or controls (not shown), such as an on/off/reset switch, a menu button, a "back" button, a volume control switch, and the like.

The smartphone 30 also includes conventional receive/transmit circuitry 44 operably connected to and/or controlled by the control circuitry 34. The receive/transmit circuitry 44 is also operably connected coupled to an antenna 48 and operates to both receive and transmit voice signals, in addition to performing data communication functions. In addition, a conventional microphone 50 and speaker 52 are both operably connected to the receive/transmit circuitry 216, wherein the microphone 50 receives voice input from the user and the speaker 52 provides sound output to the user. Thus, the receive/transmit circuitry 44 may operate in a conventional fashion to transmit, via the antenna 48, voice signals generated by the microphone 50, and to reproduce, via the speaker 52, voice signals received via the antenna 48. The receive/transmit circuitry 44 may also handle transmission and reception of text messages and/or other types of data communications via the antenna 48.

The smartphone 30 also includes a Near Field Communication (NFC) transceiver 54 operably connected to the control circuitry 34, a loop antenna 56 and a secure element 58. The NFC transceiver 54 includes electronic circuitry that is partly or wholly dedicated to implementing NFC communications functionality, and in some embodiments the NFC transceiver 54 may partially overlap with the control circuitry 34.

The term "secure element" is well known to those who are skilled in the art, and typically refers to a device that may include a small processor and volatile and/or nonvolatile memory (not separately shown) that are secured from tampering and/or reprogramming by suitable measures. Referring again to FIG. 1B, the secure element 58 may therefore be used to store, for example, one or more mobile wallet applications and/or payment card applications and/or customer verification method applications, one or more of which can be utilized when conducting purchase transactions. In some embodiments, the secure element 58 may be provided as part of the SIM card 38, whereas in other embodiments the secure element 58 may be constituted by an integrated circuit card separate from the SIM card 38 (but possibly having the same form factor as a SIM card). In some embodiments of a digital device purchased by a consumer, such as the smartphone 30, the secure element 58 may be provisioned with that consumer's payment account credentials as described below. (It should be noted that the term "secure element" is not intended to be limited to devices that are IC-based, but rather may also include any secure execution environment in a mobile device, and may include software based secure execution environments running on a main mobile device processor and/or wearable device processor.)

Figure 1C:
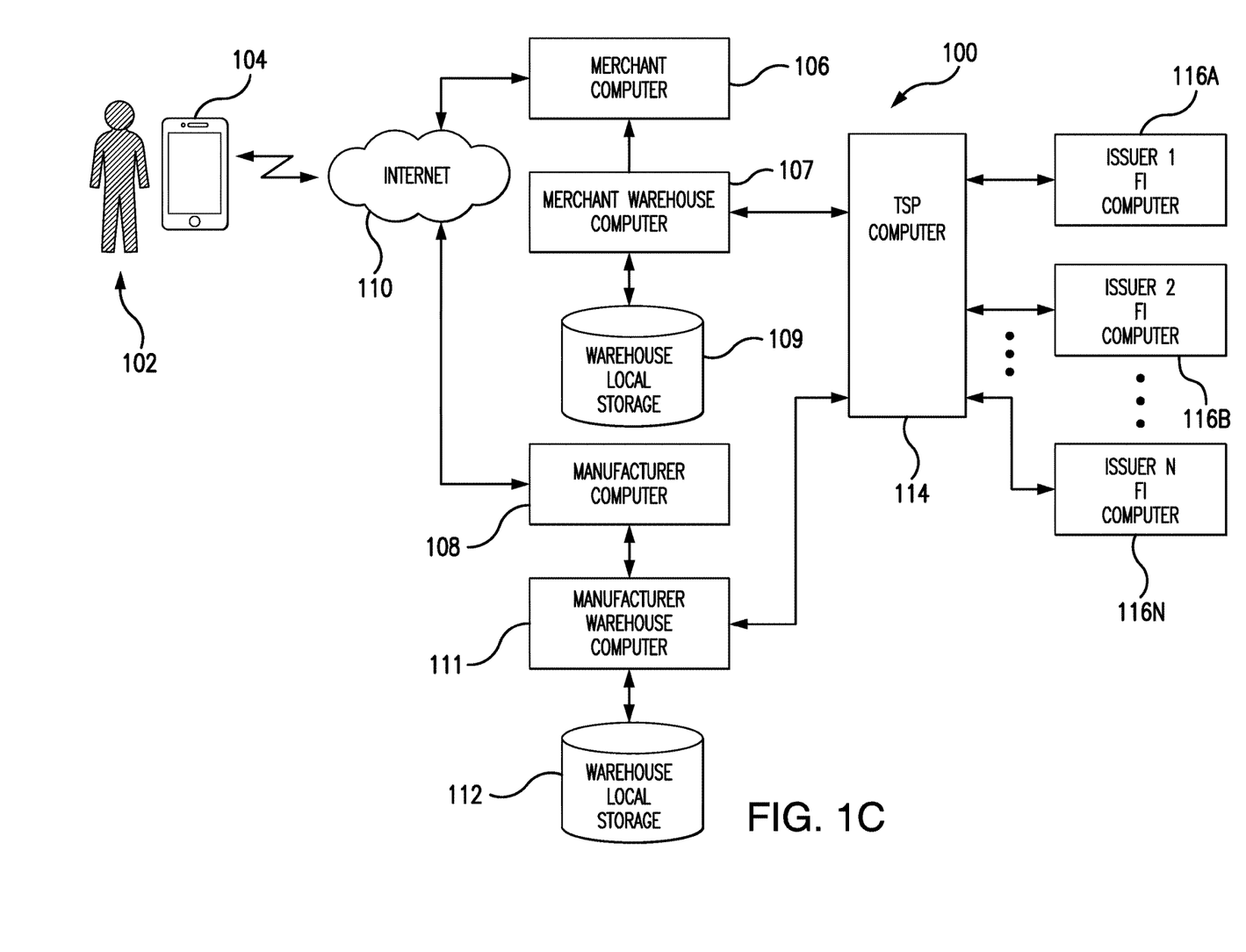
FIG. 1C is a block diagram of a system for enabling an external entity to provision consumer payment credentials to digital devices that have been ordered or purchased by consumers in accordance with embodiments of the disclosure.

FIG. 1C is a block diagram of a purchasing and provisioning system 100 for selling digital devices to consumers and for enabling an external entity to provision consumer payment credentials to the purchased and/or ordered digital devices in accordance with embodiments disclosed herein. The system 100 includes a user device 104 utilized by a consumer 102 and configured for communicating with a merchant computer 106 and/or with a manufacturer computer 108. Also included in the system 100 are a merchant warehouse computer 107 operably connected to a local storage device 109 and to the merchant computer 106, and a manufacturer warehouse computer 111 operably connected to a local storage device 112 and to the manufacturer computer 108. A trusted service provider (TSP) computer 114 (which may be a Mastercard Digital Enablement System (MDES) computer, or the like) is also included, and is operably connected to the merchant warehouse computer 107, to the manufacturer warehouse computer 111, and to a plurality of Issuer financial institution (FI) computers 116A, 116B to 116N.

Each block in FIG. 1C that represents an entity or computer should also be understood to represent one or more computers or computer systems operated by or on behalf of that entity. In addition, the purchasing and provisioning system 100 is illustrated in FIG. 1C in the context of a purchase of a single wearable digital device by a consumer 102. However, a practical embodiment of the system 100 may handle numerous purchase transactions, including numerous simultaneous transactions from a plurality of users and a plurality of user devices 104, and may also handle provisioning of consumer financial account information or consumer payment credentials to such devices. Thus, the system 100 may also include additional entities and/or computing resources that also perform at least some of the roles performed by the entities and/or computers shown explicitly in FIG. 1C.

Referring again to FIG. 1C, a consumer or customer 102 may utilize a browser or other application running on his or her user device 104 (such as a smartphone, laptop computer, tablet computer, personal digital assistant (PDA), personal digital media player, and the like) to access a merchant website (hosted by the merchant computer 106) and/or to access a manufacturer website (hosted by the manufacturer computer 108) via the Internet 110 (or other network, not shown). For example, the consumer 102 orders a wearable digital device from the merchant's website by transmitting a purchase order to the merchant computer 106, and during a checkout process that may include a merchant checkout webpage (not shown) provides an indication that he or she would like the merchant to provision the consumer's payment card account credentials to the ordered wearable digital device.

In embodiments disclosed herein, the merchant warehouse computer 107 has already performed preliminary operations and/or performed a setup process on the wearable digital devices in inventory (and/or on mobile digital devices) before receiving any purchase orders from consumers for such merchandise. The setup process may involve running scripts needed to setup an embedded Secure Element (SE) on each of the wearable digital devices and storing the setup data obtained from running the scripts in the warehouse local database 109 for later use. Thus, when a consumer purchases and/or orders a digital device from the merchant that has an embedded Secure Element (SE) and also indicates that he or she wishes to have the digital device provisioned by the merchant with the consumer's payment account credentials, in some implementations the warehouse computer 107 receives from the merchant computer 106 a purchase order for the digital device along with instructions to provision it with the consumer's payment credentials. Next, in some implementations the warehouse computer 107 looks up the secure device information for a specific digital device that fulfills the purchase order and obtains the secure element identifier (SE ID) from a warehouse database and transmits an eligibility check to a TSP computer 114 that includes the consumer's financial account information, the SE ID and secure device information. If all is in order and the purchase is completed, then an order is triggered to locate that specific digital device (which is a secure device (SD)) in inventory and pick it up (for example, instructions may be provided to warehouse personnel (or to a robot) to physically obtain the specific digital device from inventory such as from a warehouse shelf), and then a personalization script along with a SE identifier is obtained from the TSP computer 114. When the specific digital device is available then the warehouse computer applies the personalization script obtained from the TSP computer 114 to the SE of the ordered digital device such that a personalization process is applied which provisions it with tokenized payment account credentials representing the consumer's financial account. In some embodiments, the warehouse computer 107 then notifies the TSP computer 114 of the provisioning status, and next ships the ordered and/or purchased wearable digital device to the consumer 102. Upon receiving the digital wearable device, in some implementations the consumer 102 is required to activate the provisioned financial account by contacting his or her issuer FI (which will be one of the issuer FI's 116A to 116N).

Figure 2:
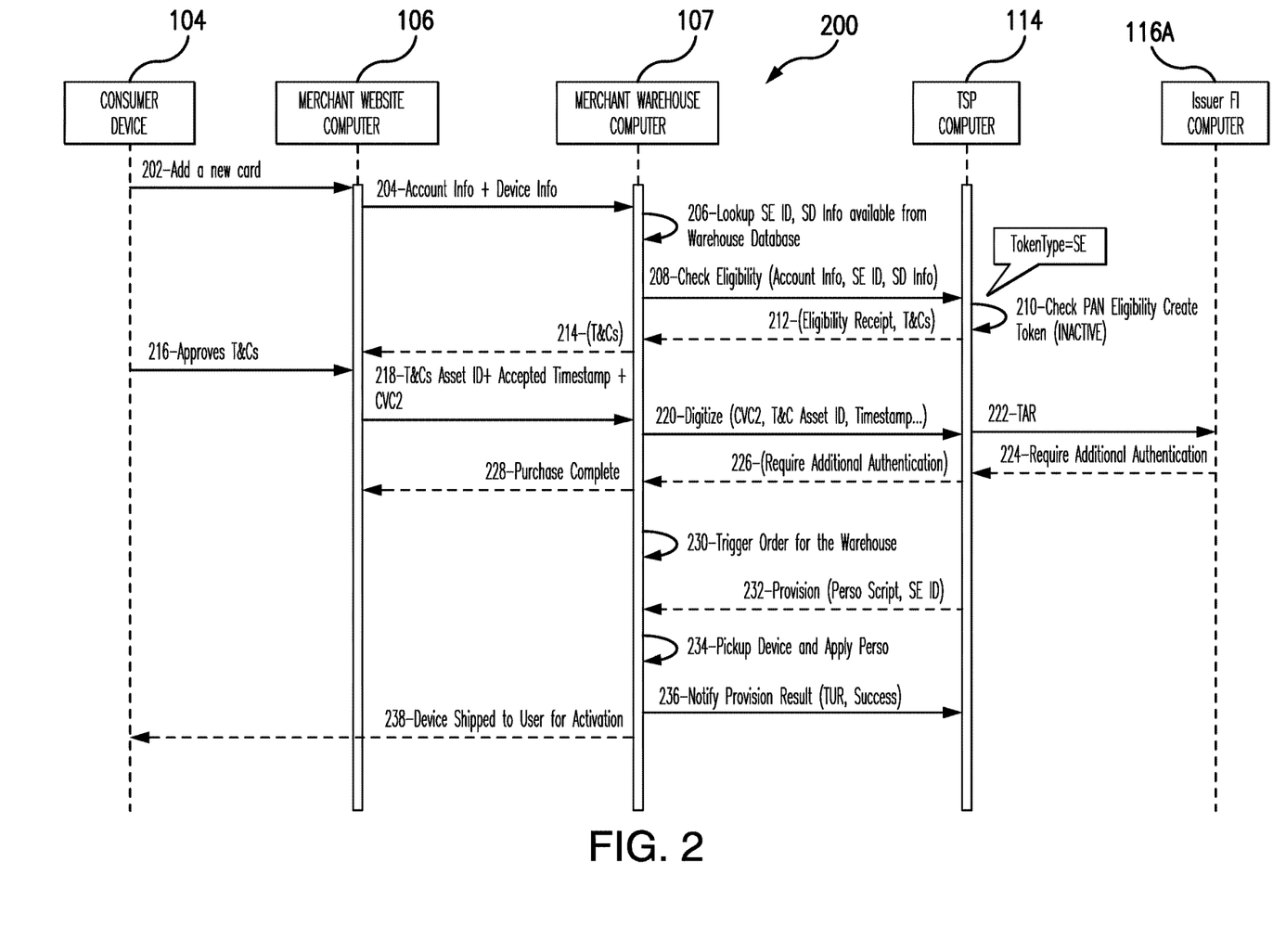
FIG. 2 is a flow diagram of a process for provisioning consumer payment credentials by an external entity to a purchased digital device in accordance with embodiments of the disclosure.

FIG. 2 is a flow diagram of a process 200 for provisioning consumer payment credentials by an external entity to a purchased digital device in accordance with embodiments disclosed herein. The process illustrated by FIG. 2 includes communications between a consumer device 104, a merchant website computer 106, a merchant certified warehouse computer 107, a TSP computer 114 and an issuer FI computer 116A (one of a plurality of issuer FIs).

As explained above, before a purchased digital device can be provisioned with the payment credentials of a consumer, the merchant certified warehouse computer 107 must ready or prepare all of the digital devices in inventory for such provisioning by conducting a setup process (not shown). In some embodiments, the warehouse setup process includes the warehouse computer 107 running scripts on each of the digital devices that are offered for sale which are capable of storing consumer payment credentials (which include mobile digital devices having a secure element (SE)) to create a secure device (SD), loading at least one payment application (for example, an MCM applet and/or a mobile chip (Mchip) payment application associated with Mastercard mobile payments) into the SE of each digital device, and generating setup data (for example, using public keys) for each digital device. The merchant certified warehouse computer 107 then stores the setup data, a Controlling Authority Security Domain (CASD) certificate (which is used for verification and/or authentication of data sent from the SE), an SE identifier, and a digital device identifier (such as a serial number) in the warehouse local database 109 for each digital device. This set-up data is for use after a consumer places an order for a digital device having an SE and indicates that she would like the merchant to provision her payment card account to the digital device.

Referring again to FIG. 2, in some embodiments after a consumer uses her consumer device 104 to place an order 202 for a digital device from an e-Commerce website hosted by the merchant website computer 106, the consumer may then be asked if she would also like her payment card account to be provisioned onto the purchased digital device. If the consumer answers yes, then the merchant computer 106 transmits 204 the consumer's account information (which may comprise a tokenized primary account number (PAN)) plus digital device information (for example, digital device (or secure device (SD)) identification data and/or SE identification data) to the merchant warehouse computer 107. The merchant warehouse computer 107 then looks up 206 the SE identification data and the secure device (SD) identification information which has already been stored and is available from the warehouse local storage device 112 (see FIG. 1). Next, the merchant warehouse computer 107 checks the eligibility of the consumer's payment card account for provisioning by transmitting 208 the consumer account information and the digital device information (e.g., the SE identifier and/or the SD information) to the TSP computer 114. The TSP computer receives the information and then utilizes the consumer's account information (e.g., the consumer's primary account number (PAN)) to check 210, for example, to see if it is within a range of PANs that are eligible for provisioning to a digital device (which may include identifying an issuer FI that issued the consumer's financial account, transmitting the consumer's account information to that issuer FI, and then receiving a response).

As shown in FIG. 2, if the consumer's PAN is eligible 210 then the TSP computer creates a payment token. In some embodiments, the TSP computer 114 next generates and transmits 212 an eligibility receipt that includes terms and conditions (T&C's) to the merchant warehouse computer 107, which forwards 214 the receipt with the T&C's to the merchant website computer 106 for presentation to the consumer.

Upon receipt and reading of the terms and conditions (T&C's), the consumer uses her consumer device 104 to transmit 216 approval of the T&C's to the merchant computer 106. The merchant computer then generates and transmits 218 a message including a T&Cs Asset identifier, an accepted timestamp and a CVC2 code (associated with the consumer's payment card) to the merchant warehouse computer 107. The merchant warehouse computer 107 then digitizes and transmits 220 the T&Cs Asset identifier, the accepted timestamp and the CVC2 code to the TSP computer 114, which then transmits 222 a Tokenization Authorization Request (TAR) to the issuer financial institution (FI) computer 116A (which issued the consumer's payment card account). In some implementations, the issuer FI 116A may require additional consumer authentication and thus may transmit 224 a request for the additional consumer authentication data to the TSP computer 114, which forwards it 226 to the merchant warehouse computer 107, which also forwards the request 228 to the merchant website computer 106 for completing the consumer's purchase transaction for the digital device. When the purchase transaction is completed by the consumer, which may include providing, by user of the consumer device 104, additional consumer authentication data (such as a personal identification number (PIN) and/or biometric data such as fingerprint data), then an order 230 is triggered (for example, automatically by the merchant warehouse computer 107) for the merchant warehouse computer 107 to physically obtain the ordered digital device for the consumer and to continue processing to provision the consumer's payment card credentials to that purchased digital device.

At this point in the processing, the merchant warehouse computer 107 receives 232 personalization data (such as a Personalization Script and the SE identifier) from the TSP computer 114, then locates 234 the purchased digital device associated with the SE identifier, and utilizes the personalization script to the digital device. Next, the merchant warehouse computer 107 transmits 236 a notification to the TSP computer 114 indicating successful provisioning of the digital device ordered by the consumer, which may include providing a Token Unique Reference (TUR) success message. The merchant warehouse computer 107 then ships 238 the provisioned digital device to the consumer. As also mentioned above, after receiving the digital device, the consumer activates the provisioned payment card account by contacting his or her issuing bank.

Figure 3:
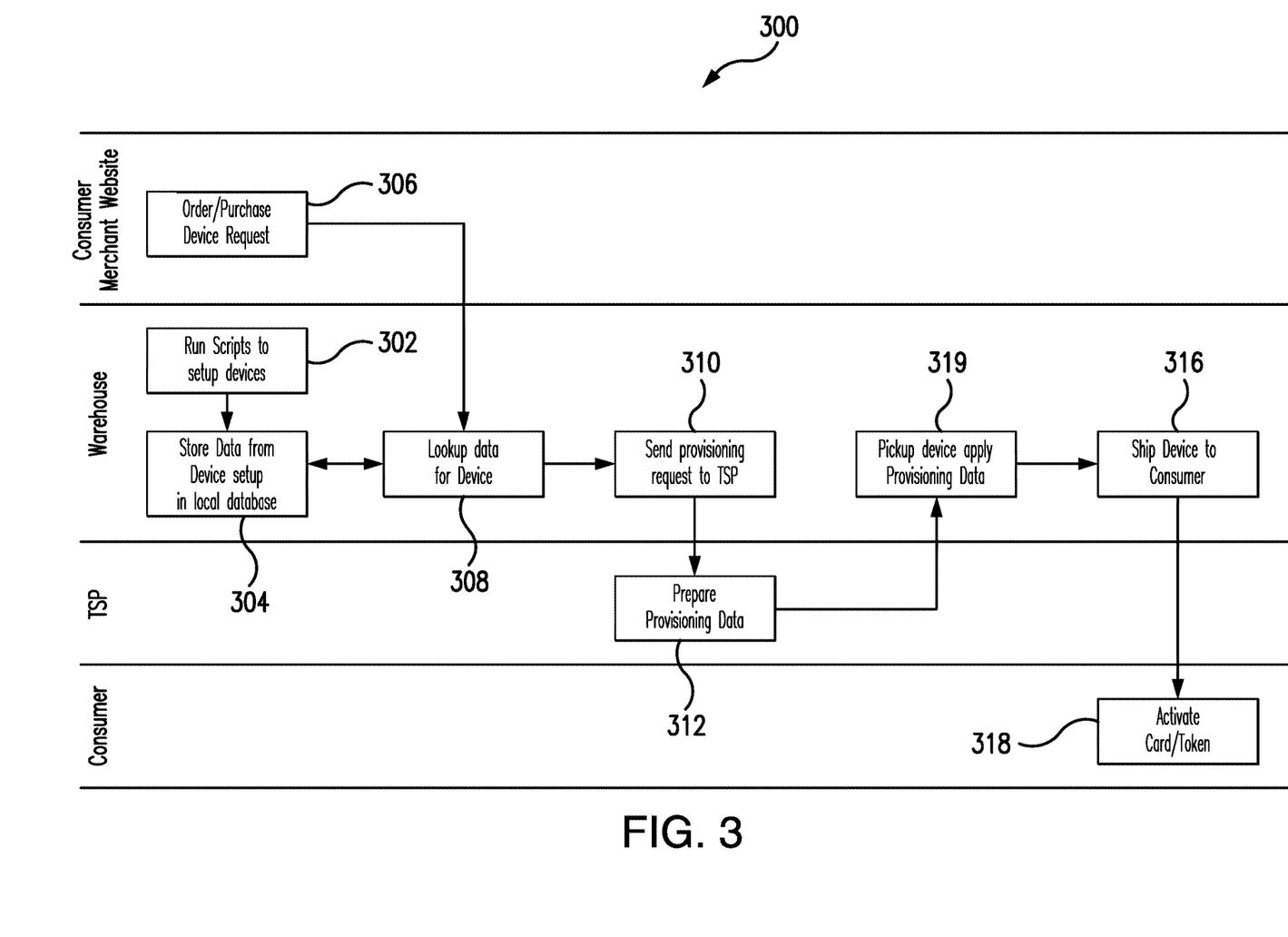
FIG. 3 is another flow diagram depicting a process for provisioning consumer payment credentials by a warehouse computer to a purchased digital device in accordance with aspects of the present disclosure.

FIG. 3 is another flow diagram depicting a process 300 for provisioning consumer payment credentials by a warehouse computer (for example, a certified warehouse computer) to a purchased digital device in accordance with embodiments disclosed herein. In some embodiments, a certified warehouse computer of a merchant or manufacturer produces or creates secure devices (SD's) by running 302 two or more scripts for digital devices that have a secure element (SE) as part of a setup process for setting-up the digital devices in inventory at the warehouse. The certified warehouse computer then stores 304 data from the digital device setup process of each of those digital devices having an SE in a local database. In some implementations, a merchant website computer receives 306 an order from a consumer or customer to purchase or obtain a digital device and then transmits the purchase order to the certified warehouse computer. The warehouse computer then performs 308 a look up operation for the ordered digital device, locates a particular digital device that satisfies the purchase order and finds the stored setup data for that digital device. The warehouse computer then transmits 310 a provisioning request to a trusted service provider (TSP) computer, wherein the provisioning request includes the stored setup data. The TSP computer receives the provisioning request and prepares and transmits 312 the provisioning data, which may include a personalization script, to the certified warehouse computer. The certified warehouse computer receives the provisioning request, physically obtains 314 the purchased digital device from inventory of the warehouse, and then may utilize the personalization script to provision the consumer's payment card account data to the SE of the digital device. The certified warehouse computer then ships 316 the purchased digital device to a delivery address of the customer, who then activates the provisioned payment card account by contacting his or her issuer financial institution.

Figure 4:
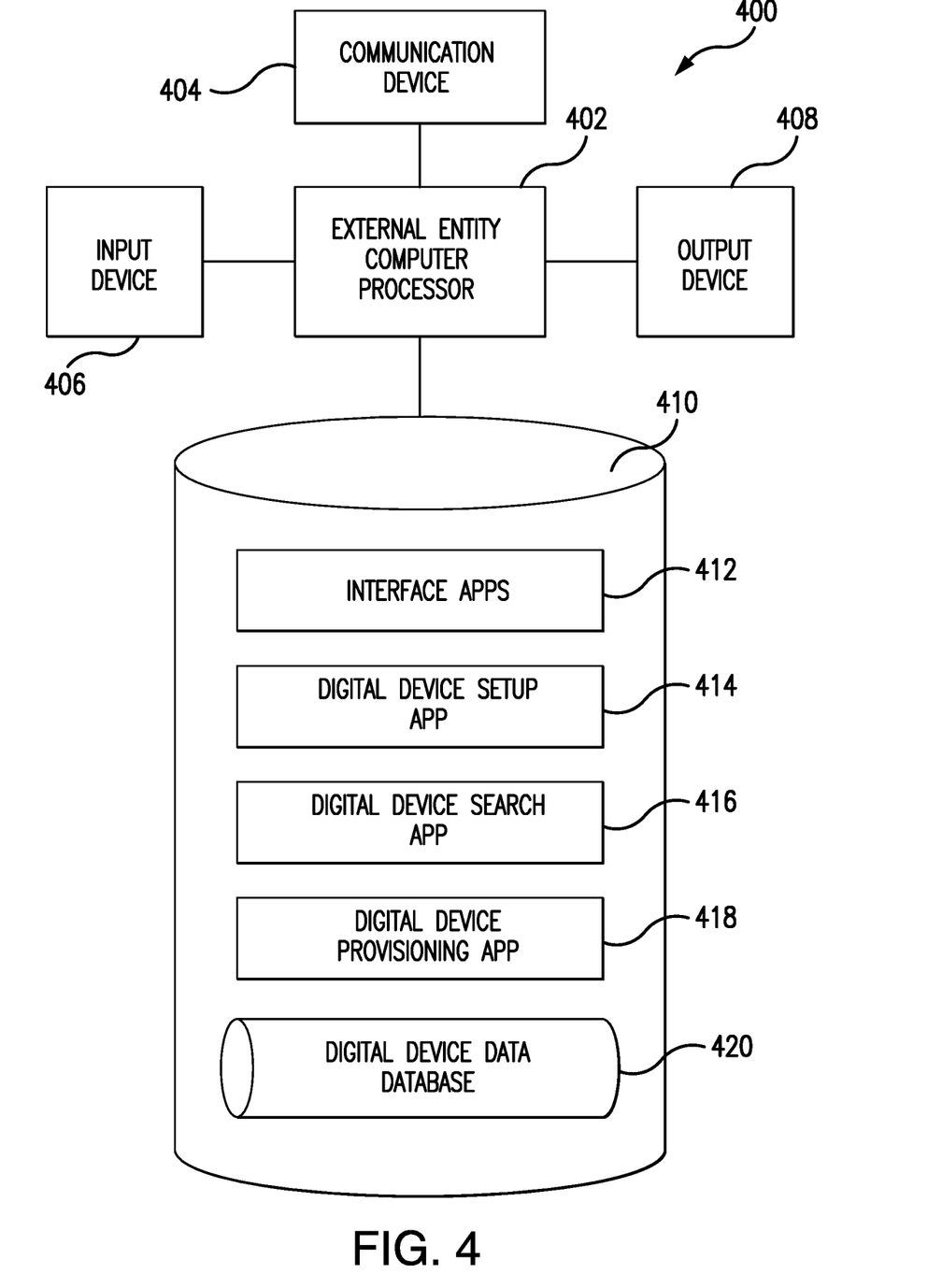
FIG. 4 is a block diagram illustrating an example embodiment of an external entity computer system for enabling provisioning of a consumer's payment credentials to an ordered digital device in accordance with the disclosure.

FIG. 4 is a block diagram illustrating an example embodiment of an external entity computer 400 for enabling provisioning of a consumer's payment credentials to an ordered digital device. The external entity computer 400 may implement at least some functions of the certified warehouse computer 107 shown in FIG. 1C and discussed with regard to FIGS. 2 and 3. The external entity computer 400 may thus be referred to as the "certified warehouse computer" or "manufacturer warehouse computer," and may resemble a mainframe or server computer, and may be controlled by software to cause it to function as described herein. The external entity computer may also be a custom designed computer or computer system including components which are configured to operate in a manner consistent with processes described herein.

Referring to FIG. 4, the external entity computer 400 includes an external entity computer processor 402 operatively coupled to a communication device 404, an input device 406, an output device 408 and a storage device 410.

The external entity computer processor 402 may constitute one or more processors, which may be custom designed and/or optimized to execute instructions or processor-executable steps contained in program instructions so as to control the external entity warehouse computer 400 to provide desired functionality.

Communication device 404 may be used to facilitate communications with, for example, other devices such as other components of the system 100 shown in FIG. 1C. Thus, communication device 404 may comprise numerous communication ports (not separately shown), to allow the external entity computer 400 to communicate simultaneously with a considerable number of other computers, and/or to simultaneously handle numerous functions and/or transactions. The communication device 404 may also be configured for wireless communications and/or wired communications via various different types of networks, such as the Internet.

Input device 406 may comprise one or more of any type of peripheral device typically used to input data into a computer. For example, the input device 406 may include a keyboard and a mouse and/or a touchscreen. Output device 408 may comprise, for example, a display such as a touchscreen and/or a printer. In some embodiments, the input device 406 and output device 408 may both consist of a touchscreen.

Storage device 410 may be any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory or other type of memory or storage device. Any one or more of such information storage devices may be considered to be a non-transitory computer-readable storage medium or computer usable medium or memory.

Storage device 410 stores one or more programs for controlling external entity processor 402. The programs comprise program instructions (which may be referred to as computer readable program code means) that contain processor-executable process steps of the external entity computer 400, executed by the external entity computer processor 402 to cause the external entity computer 400 to function as described herein.

The programs may include one or more conventional operating systems (not shown) that control the external entity processor 402 so as to manage and coordinate activities and sharing of resources in the external entity computer 400, and to serve as a host for application programs (described below) that run on the external entity computer 400.

The storage device 410 may also store interface applications 412 which include executable instructions for providing software interfaces to facilitate interaction between the external entity computer 400 and other components of the system 100. In addition, the storage device 410 may include a digital device setup application 412, a digital device search application 414 (for searching for information concerning the location of a digital device which fulfills an order from a consumer), and a digital device provisioning application 418. Aspects of these applications or programs, and the manners in which the certified warehouse computer operates under control of these programs, have been discussed herein.

The storage device 410 may also store, and the external entity computer 400 may also execute, other programs, which are not shown. For example, such programs may include a digital device provisioning status reporting application, which may provide provisioning status messages to, for example, a TSP computer. The other programs may also include, e.g., device drivers, database management software, etc.

Moreover, the storage device 410 may also store a digital device data database 420 for storing digital device identification data, such as serial numbers, and the like. In addition, one or more further databases (not shown) needed for operation of the certified warehouse computer 400 may also be included.

The disclosed methods and systems advantageously permits digital device manufacturers and merchants who offer digital devices (such as wearable digital devices) for sale, to also offer consumers the opportunity to have their payment card account credentials automatically provisioned by an external entity to the secure element (SE) of a purchased digital device. The facilitation and streamlining of the provisioning process to an SE of a purchased digital device improves the consumer shopping experience while also providing merchants and/or digital device manufacturers who offer such a provisioning service to gain a competitive advantage in the marketplace. In particular, digital device partners (merchants and/or manufacturers) of a payments processing entity (such as Mastercard International Incorporated) who participate in offering the disclosed automatic digital device provisioning service may gain a competitive advantage over other merchants and/or manufactures who do not provide such a service to consumers. The disclosed processes and systems also advantageously permit wearable digital device providers to scale up their business offerings, to provide yet another retail channel for payment account provisioning and sales. Such operations may therefore increase overall activations of payment accounts for digital wearable devices to the benefit of issuer FI's, payment processing entities, and other entities (such as external entities) involved in the retail and/or e-Commerce environment. Thus, consumers are advantageously provided with a frictionless channel for provisioning newly purchased digital devices with their financial account credentials, which may also encourage repeat business from those consumers for the merchants and manufacturers offering the disclosed provisioning service.

As used herein, the term "computer" should be understood to encompass a single computer or two or more computers in communication with each other. In addition, as used herein, a "server" includes a computer or computer system that responds to numerous requests for service from other devices.

As used herein, the term "processor" should be understood to encompass a single processor or two or more processors in communication with each other.

As used herein, the term "memory" should be understood to encompass a single memory or storage device or two or more memories or storage devices. Such It should be understood that the methods disclosed herein with reference to the various figures may be implemented using software including computer-executable instructions stored on one or more computer-readable media (e.g., non-transitory computer-readable media), such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosure. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared communications or any other "wireless" communications medium), electronic communications, or other such communication means.

The above descriptions and illustrations of processes herein should not be considered to imply a fixed order for performing the process steps. Rather, the process steps may be performed in any order that is practicable, including simultaneous performance of at least some steps and/or omission of steps.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method for provisioning a secure element of a newly purchased digital device by an external entity with financial credentials of a consumer before delivery of the digital device to the consumer comprising:
   receiving, by an external entity computer from one of a merchant computer or a manufacturer computer, a consumer purchase order for a newly purchased digital device having a secure element (SE), and wherein the consumer purchase order comprises consumer account information of a consumer payment card account and instructions to provision the secure element of the newly purchased digital device with financial account token credentials of the consumer payment card account before delivery of the digital device to the consumer;
   looking up, by the external entity computer, secure device information in an external entity database for a specific digital device in inventory that fulfills the consumer purchase order, wherein the secure device information includes a secure element identifier (SE ID);
   transmitting, by the external entity computer to a token service provider (TSP) computer, an eligibility check comprising the consumer account information and the SE ID enabling the TSP computer to interact with an issuer financial institution (FI) computer;
   issuing, by the external entity computer, an order to obtain the specific digital device having the SE ID from inventory;
   receiving, by the external entity computer from the TSP computer, provisioning data including a personalization script comprising the financial account token credentials of the consumer payment card account, wherein receipt of the provisioning data indicates that the consumer payment card account is eligible for provisioning;

personalizing, by the external entity computer, the SE of the digital device having the SE ID obtained from inventory with the financial account token credentials of the consumer payment card account by running the personalization script on the SE of the digital device prior to shipping the newly purchased digital device to the consumer.

2. The method of claim 1, further comprising shipping the personalized digital device to the consumer.

3. The method of claim 1, further comprising, prior to receiving the consumer order:
producing, by the external entity computer, secure digital devices by running at least two scripts on each of a plurality of digital devices having an SE;
generating, by the external entity computer, setup data for each of the plurality of digital devices; and
storing, by the external entity computer in a local storage device, the setup data and a digital device identifier for each of the plurality of digital devices.

4. The method of claim 3, further comprising, after running the at least two scripts for each of the plurality of digital devices having an SE, loading at least one payment application into the SE for each of the plurality of digital devices.

5. The method of claim 3, further comprising generating, by the external entity computer after running the at least two scripts for each of the plurality of digital devices having an SE, response data for each of the plurality of digital devices.

6. The method of claim 5, further comprising storing, by the external entity computer in the local storage device, the response data for each of the plurality of digital devices.

7. The method of claim 6, further comprising storing, by the external entity (original) computer in the local storage device, a controlling authority security domain (CASD) certificate, an SE identifier, and a digital device identifier for each of the plurality of digital devices.

8. The method of claim 3, wherein the consumer payment credentials comprises at least one of a primary account number (PAN) or a tokenized account number of the consumer.

9. The method of claim 1, further comprising, prior to receiving provisioning data from the TSP computer:
receiving, by the external entity computer from the TSP computer, an eligibility receipt comprising terms and conditions;
transmitting, by the external entity computer to a merchant computer, the eligibility receipt comprising the terms and conditions;
receiving, by the external entity computer from the merchant computer, an acceptance message indicating acceptance of the terms and conditions by the consumer; and
transmitting, by the external entity computer to the TSP computer, the acceptance message.

10. The method of claim 9, wherein the acceptance message further comprises a terms and conditions asset identifier, an acceptance timestamp and a CVC2 code, and wherein the external entity computer transmits a digitized version of the conditions asset identifier, the acceptance timestamp and the CVC2 code to the TSP computer.

11. An external entity computer for provisioning a secure element of a newly purchased digital device with financial credentials of a consumer before delivery of the digital device to the consumer comprising:
an external entity processor;
a communication device operably connected to the external entity processor; and
a storage device operably connected to the external entity processor;
wherein the storage device stores processor executable instructions which when executed cause the external entity processor to:
receive from one of a merchant computer or a manufacturer computer, a consumer purchase order for a newly purchased digital device having a secure element (SE), and wherein the consumer purchase order comprises consumer account information of a consumer payment card account and instructions to provision the secure element of the newly purchased digital device with financial account token credentials of the consumer payment card account before delivery of the digital device to the consumer;
look up secure device information in an external entity database for a specific digital device in inventory that fulfills the consumer purchase order, wherein the secure device information includes a secure element identifier (SE ID);
transmit an eligibility check to a token service provider (TSP) computer, the eligibility check comprising the consumer account information and the SE ID enabling the TSP computer to interact with an issuer financial institution (FI) computer;
issue an order to obtain the specific digital device having the SE ID from inventory;
receive provisioning data including a personalization script comprising the financial account token credentials of the consumer payment card account from the TSP computer, wherein receipt of the provisioning data indicates that the consumer payment card account is eligible for provisioning; and
personalize the SE of the digital device having the SE ID obtained from inventory with the financial account token credentials of the consumer payment card account by running the personalization script on the SE of the digital device prior to shipping the newly purchased digital device to the consumer.

12. The external entity computer of claim 11, wherein the storage device stores further processor executable instructions which when executed cause the external entity processor to cause shipping of the personalized digital device to the consumer.

13. The external entity computer of claim 11, wherein the storage device stores further processor executable instructions, prior to the instructions for receiving the consumer order, which when executed cause the external entity processor to:
produce secure digital devices by running at least two scripts on each of a plurality of digital devices having an SE;
generate setup data for each of the plurality of digital devices; and
store the setup data and digital device identifier for each of the plurality of digital devices in a local storage device.

14. The external entity computer of claim 13, wherein the storage device stores further processor executable instructions, after the instructions for running the at least two scripts for each of the plurality of digital devices having an SE, which when executed cause the external entity processor to load at least one payment application into the SE for each of the plurality of digital devices.

15. The external entity computer of claim 13, wherein the storage device stores further processor executable instructions which when executed cause the external entity processor to, after running the at least two scripts for each of the plurality of digital devices having an SE, generate response data for each of the plurality of digital devices.

16. The external entity computer of claim 15, wherein the storage device stores further processor executable instructions which when executed cause the external entity processor to store the response data for each of the plurality of digital devices in the local storage device.

17. The external entity computer of claim 16, wherein the storage device stores further processor executable instructions which when executed cause the external entity processor to store a controlling authority security domain (CASD) certificate, an SE identifier, and a digital device identifier for each of the plurality of digital devices.

18. The external entity computer of claim 11, wherein the storage device stores further processor executable instructions, prior to the instructions for receiving provisioning data from the TSP computer, which when executed cause the external entity processor to:

receive an eligibility receipt comprising terms and conditions from the TSP computer;
transmit the eligibility receipt comprising the terms and conditions to a merchant computer;
receive an acceptance message indicating acceptance of the terms and conditions by the consumer from the merchant computer; and
transmit the acceptance message to the TSP computer.

19. The method of claim 1, further comprising transmitting, by the external entity computer, a notification to the TSP computer indicating successful personalization of the newly purchased digital device.

20. The external entity computer of claim 11, wherein the storage device stores further processor executable instructions which when executed cause the external entity processor to transmit a notification to the TSP computer indicating successful personalization of the newly purchased digital device.

* * * * *